US008265147B2

(12) United States Patent
Kim

(10) Patent No.: US 8,265,147 B2
(45) Date of Patent: Sep. 11, 2012

(54) METHOD FOR GENERATING REDUCED IMAGE OF ORIGINAL IMAGE COMPRISING ADAPTIVELY ENCODED MACROBLOCKS, AND IMAGE APPARATUS THEREOF

(75) Inventor: Eun-seok Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1427 days.

(21) Appl. No.: 11/776,031

(22) Filed: Jul. 11, 2007

(65) Prior Publication Data
US 2008/0165846 A1  Jul. 10, 2008

(30) Foreign Application Priority Data

Jan. 10, 2007  (KR) .................. 10-2007-0002916

(51) Int. Cl.
*H04N 7/12* (2006.01)
*H04N 11/02* (2006.01)
*H04N 11/04* (2006.01)
*G06K 9/46* (2006.01)

(52) U.S. Cl. .............. 375/240.12; 382/238; 375/240.13; 375/240.15; 375/240.16

(58) Field of Classification Search .................. None
See application file for complete search history.

(56) References Cited

U.S. PATENT DOCUMENTS

| | | | |
|---|---|---|---|
| 6,108,448 A * | 8/2000 | Song et al. .................. 382/235 |
| 6,445,828 B1 | 9/2002 | Yim | |
| 2003/0234798 A1* | 12/2003 | Ratnakar .................. 345/660 |
| 2004/0126021 A1 | 7/2004 | Sull et al. | |
| 2005/0089235 A1* | 4/2005 | Sakaguchi et al. ............ 382/239 |
| 2005/0276505 A1* | 12/2005 | Raveendran .................. 382/268 |
| 2006/0109904 A1 | 5/2006 | Hamada | |
| 2006/0227871 A1 | 10/2006 | Budagavi | |
| 2006/0267809 A1 | 11/2006 | Ogasawara et al. | |

OTHER PUBLICATIONS

Shih-Fu Chang et al, "Manipulation and Compositing of MC-DCT Compressed Video", IEEE Journal on Selected Areas in Communications, Jan. 1, 1995, pp. 1-11, vol. 13 No. 1, IEEE, New York, NY, US.

Beon-Lock Yeo et al., "On the Extraction of DC Sequence from MPEG Compressed Video", Proceedings of the International Conference on Image Processing (ICIP), Oct. 23, 1995, pp. 260-263, vol. 2, IEEE Comp Soc. Press, Los Alamitos, US.

* cited by examiner

*Primary Examiner* — Nathan Flynn
*Assistant Examiner* — Trang Doan
(74) *Attorney, Agent, or Firm* — Sughrue Mion, PLLC

(57) ABSTRACT

A method for generating a reduced image of an original image in which macroblocks are adaptively encoded, and an image apparatus thereof are provided. The method including extracting an average of compression blocks of current super macroblocks contained in a compression image, the compression image being encoded by intra prediction; computing an average of prediction blocks, using a portion of components of previous super macroblocks and a portion of components of blocks neighboring the prediction blocks corresponding to the compression blocks, if an encoding technique of the current super macroblocks is different from an encoding technique of the previous super macroblocks at a left edge of the current super macroblocks; and generating a reduced image using the average of the compression blocks and the average of the prediction blocks. The apparatus includes an extractor; a computation part; and an adder.

12 Claims, 8 Drawing Sheets

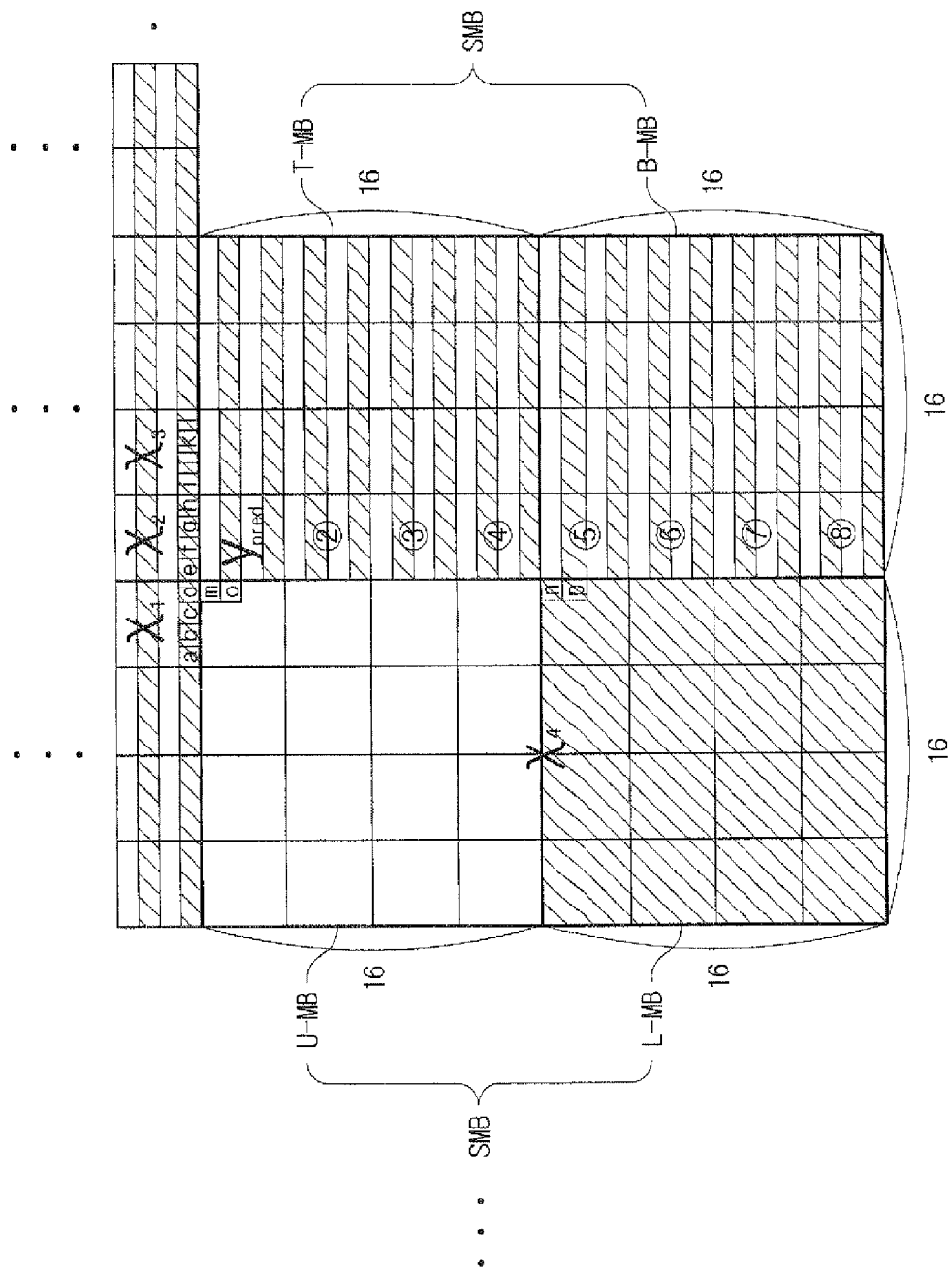

METHOD FOR GENERATING REDUCED IMAGE OF ORIGINAL IMAGE COMPRISING ADAPTIVELY ENCODED MACROBLOCKS, AND IMAGE APPARATUS THEREOF

CROSS-REFERENCE TO RELATED APPLICATIONS

This application claims priority under 35 U.S.C. §119 from Korean Patent Application No. 10-2007-0002916, filed on Jan. 10, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to generating a reduced image, and more particularly, to generating a reduced image of an original image.

2. Description of the Related Art

Recently, various types of digital multimedia services using high definition televisions (HDTVs), digital multimedia broadcasting (DMB), or Internet Protocol (IP) TV have become activated as a result of the rapid development of technologies relating to digital moving image processing. In particular, since HDTVs provide a large size screen with a high image quality, products, such as set-top boxes for HDTVs or personal video recorders (PVRs) for HDTVs, need to enable a user to easily search for scenes or programs which the user desires to view. This function is generally provided through a reduced image called as a thumbnail image.

Thumbnail images are typically extracted using a direct current (DC) image extraction method using a DC component indicating the average of blocks in a spatial frequency domain represented by a discrete cosine transform (DCT) coefficient.

The DC image extraction method may be used in a Moving Picture Experts Group-4 (MPEG-4) based system using a technology for individually compressing and encoding each block in the spatial frequency domain represented by the DCT coefficient.

However, a current block is dependent on a previous block and encoded in an H.264 encoding block by intra prediction, and thus it is impossible to apply the above DC image extraction method.

Accordingly, in order to generate a thumbnail image of an original image comprising blocks encoded by intra prediction, the blocks of the original image are decoded to obtain an original image, and the original image then needs to be used. Therefore, the computations and time required for generating the reduced image are increased.

In particular, H.264 supports an Adaptive Frame/Field (AFF) encoding technique, and accordingly, there is a need for a method for generating a reduced image of an original image without decoding blocks of the original image encoded using the AFF encoding technique.

SUMMARY OF THE INVENTION

Exemplary embodiments of the present invention address the above disadvantages and other disadvantages not described above. Also, the present invention is not required to overcome the disadvantages described above, and an exemplary embodiment of the present invention may not overcome any of the problems described above.

The present invention provides a method for generating a reduced image and an image apparatus thereof, in which a reduced image of an original image is generated without decoding blocks of the original image which are encoded using an AFF encoding technique by intra prediction.

According to an aspect of the present invention, there is provided a method for generating a reduced image, the method comprising extracting an average of compression blocks of current super macroblocks contained in a compression image, the compression image encoded by intra prediction; computing an average of prediction blocks, using a portion of components of previous super macroblocks and a portion of components of blocks neighboring the prediction blocks corresponding to the compression blocks, if an encoding technique of the current super macroblocks is different from an encoding technique of the previous super macroblocks at a left edge of the current super macroblocks; and generating a reduced image using the average of the compression blocks and the average of the prediction blocks.

The computing may comprise computing the average of the prediction blocks using a portion of components at a rightmost edge of upper frame macroblocks of the previous super macroblocks and a portion of components at a rightmost edge of lower frame macroblocks of the previous super macroblocks, if the current super macroblocks are super macroblocks generated by a field encoding technique and the previous super macroblocks are super macroblocks generated by a frame encoding technique.

Additionally, the computing may comprise computing the average of the prediction blocks using a portion of odd-numbered components at the rightmost edge of the previous super macroblocks or a portion of even-numbered components at the rightmost edge of the previous super macroblocks, if the current super macroblocks are super macroblocks generated by the frame encoding technique and the previous super macroblocks are super macroblocks generated by the field encoding technique.

The computing may comprise computing the average of the prediction blocks using a portion of components of the neighboring blocks to the upper-left, upper and upper-right edges of the prediction block and a portion of components of the previous super macroblocks. The generating may comprise adding the average of the compression blocks and the average of the prediction blocks to generate a reduced image.

The computing may comprise computing the average of the prediction blocks using frequency values at the bottommost edge of the neighboring block to the upper-left edge of the prediction block, frequency values at the bottommost edge of the neighboring block to the upper edge of the prediction block, frequency values at the bottommost edge of the neighboring block to the upper-right edge of the prediction block, frequency values at the rightmost edge of the previous super macroblocks, and frequency values of a portion of components at the rightmost edge of the previous super macroblocks.

The compression image may comprise an original image encoded using an Adaptive Frame/Field (AFF) encoding technique by intra prediction.

According to another aspect of the present invention, there is provided an image apparatus comprising an extractor which extracts an average of compression blocks of current super macroblocks contained in a compression image, the compression image encoded by intra prediction; a computation part which computes an average of prediction blocks, using a portion of components of previous super macroblocks and a portion of components of blocks neighboring the prediction blocks corresponding to the compression blocks, if an encoding technique of the current super macroblocks is different from an encoding technique of the previous super macroblocks at a left edge of the current super macroblocks; and an adder which generates a reduced image using the average of the compression blocks and the average of the prediction blocks.

The computation part may compute the average of the prediction blocks using a portion of components at a rightmost edge of upper frame macroblocks of the previous super macroblocks and a portion of components at a rightmost edge of lower frame macroblocks of the previous super macroblocks, if the current super macroblocks are super macroblocks generated by a field encoding technique and the previous super macroblocks are super macroblocks generated by a frame encoding technique.

The computation part may compute the average of the prediction blocks using a portion of odd-numbered components at the rightmost edge of the previous super macroblocks or a portion of even-numbered components at the rightmost edge of the previous super macroblocks, if the current super macroblocks are super macroblocks generated by the frame encoding technique and the previous super macroblocks are super macroblocks generated by the field encoding technique.

The computation part may compute the average of the prediction blocks using a portion of components of the neighboring blocks to the upper-left, upper and upper-right edges of the prediction block and a portion of components of the previous super macroblocks. The adder may add the average of the compression blocks and the average of the prediction blocks to generate a reduced image.

Additionally, the computation part may compute the average of the prediction blocks using frequency values at the bottommost edge of the neighboring block to the upper-left edge of the prediction block, frequency values at the bottommost edge of the neighboring block to the upper edge of the prediction block, frequency values at the bottommost edge of the neighboring block to the upper-right edge of the prediction block, frequency values at the rightmost part of the previous super macroblocks, and frequency values of a portion of components at the rightmost part of the previous super macroblocks.

The compression image may comprise an original image encoded using an Adaptive Frame/Field (AFF) encoding technique by intra prediction.

BRIEF DESCRIPTION OF THE DRAWINGS

The above and other aspects of the present invention will be more apparent by describing certain exemplary embodiments of the present invention with reference to the accompanying drawings, in which:

FIGS. 3A and 3B are exemplary views explaining an operation for computing the average of prediction blocks, when previous super macroblocks are super macroblocks generated by a frame encoding technique and current super macroblocks are super macroblocks generated by a field encoding technique;

DETAILED DESCRIPTION OF EXEMPLARY EMBODIMENTS OF THE PRESENT INVENTION

Figure 1:
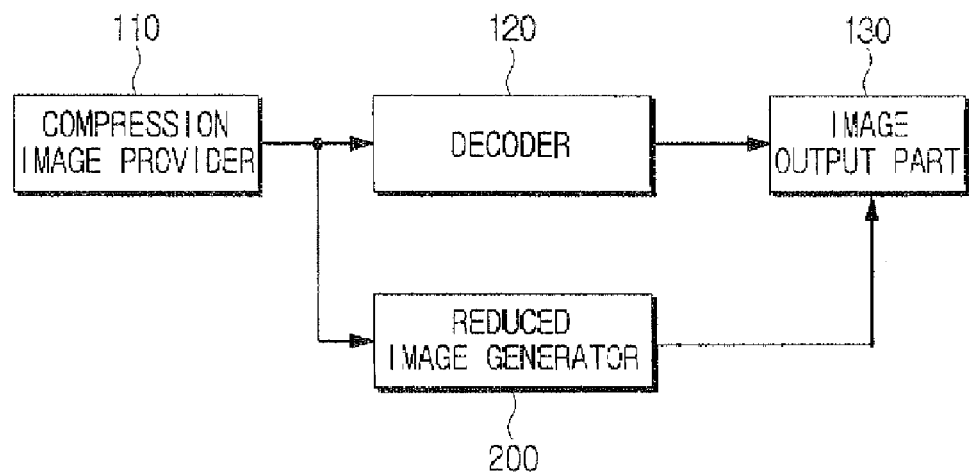
FIG. 1 is a block diagram of an image apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of an image apparatus according to an exemplary embodiment of the present invention. The image apparatus generates a reduced image of an original image to provide the reduced image to a user. The image apparatus may generate a reduced image of an original image without decoding blocks of the original image comprising the blocks encoded by an intra prediction.

In particular, the image apparatus according to an exemplary embodiment of the present invention may generate a reduced image of an original image without decoding blocks of the original image, even if the original image is encoded using an Adaptive Frame/Field (AFF) encoding technique.

In FIG. 1, the image apparatus according to an exemplary embodiment of the present invention comprises a compression image provider 110, a decoder 120, an image output part 130, and a reduced image generator 200.

The compression image provider 110 provides a compression image to the decoder 120 and reduced image generator 200. The compression image provided by the compression image provider 110 may be an original image encoded using the AFF encoding technique by intra prediction.

The compression image provided by the compression image provider 110 may be i) a compression image received from a broadcasting station wiredly or wirelessly, ii) a compression image received from an external device, or iii) a compression image read out from a recoding medium.

The decoder 120 decodes the blocks of the compression image provided by the compression image provider 110, and generates an extended (uncompressed) image.

The image output part 130 displays an image output from the decoder 120 and/or a reduced image output from the reduced image generator 200 on a display.

The reduced image generator 200 computes the averages of each block of a current image, and generates a reduced image based on the computed average values.

The average of a block denotes a sum of an average of compression blocks and an average of prediction blocks, that is, "the average of the block=the average of the compression blocks+the average of the prediction blocks". The compression block denotes a block of the compression image provided by the compression image provider 110, and the prediction block denotes to a block whose components are predicted based on components of neighboring blocks. The average of the compression blocks is extracted using the components of the compression block, but the average of the prediction blocks is computed using the components of neighboring blocks.

Figure 2:
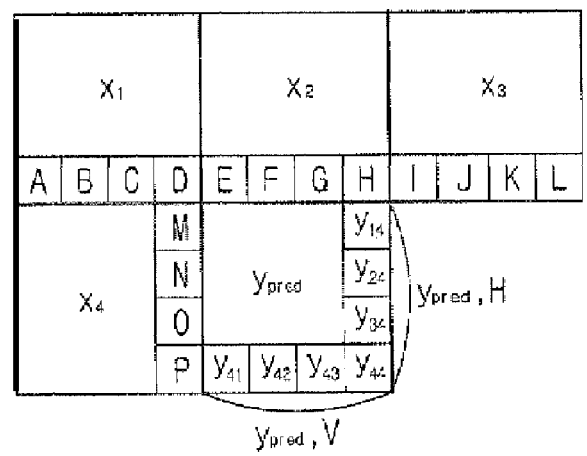
FIG. 2 is an exemplary view explaining a process for computing the average of a current prediction block on a pixel domain.

Hereinafter, a process for computing the average of the prediction blocks will be described in detail. FIG. 2 is an exemplary view explaining a process for computing the average of a current prediction block $y_{pred}$ on a pixel domain. Pixels and pixel values are represented by the same character for ease of understanding and convenience of description. For example, the pixel value of pixel "A" is "A".

The average of the current prediction block $y_{pred}$ is computed using pixel values of some pixels among pixels of blocks $x_1$, $x_2$, $x_3$, and $x_4$ adjacent to the current prediction block $y_{pred}$. More specifically, the average of the current prediction block $y_{pred}$ is computed using 1) "V-component" (pixel values A, B, C, and D of pixels at the bottommost) of block $x_1$ at the upper-left edge of the current prediction block $y_{pred}$, 2) "V-component" (pixel values E, F, G, and H of pixels at the bottommost) of block $x_2$ at the upper edge of the current prediction block $y_{pred}$, 3) "V-component" (pixel values I, J, K, and L of pixels at the bottommost) of block $X_3$ at the upper-right edge of the current prediction block $y_{pred}$, and 4) "H-component" (pixel values M, N, O, and P of pixels at the rightmost) of block $X_4$ at the left edge of the current prediction block $y_{pred}$. The computation is performed by the following Equation 1.

$$y_{pred,ave} = x_{1,V}c_1 + x_{2,V}c_2 + x_{3,V}c_3 + c_4 x_{4,H}$$

$$M(y_{pred,ave}) = y_{pred,ave}(0,0) \quad \text{[Equation 1]}$$

In Equation 1, $M(Y_{pred,ave})$ indicating a coefficient of (0,0) at the leftmost/uppermost of $y_{pred,ave}$ denotes an average of the current prediction block $y_{pred}$. $x_V$ indicating a vertical matrix of V-components of block x denotes a square matrix obtained by vertically arranging the V-components of block x. For example, $x_{2,V}$ indicating a vertical matrix of V-components of block $x_2$ is shown below.

$$X_{2,V} = \begin{matrix} E & F & G & H \\ E & F & G & H \\ E & F & G & H \\ E & F & G & H \end{matrix}$$

Additionally, xH indicates a horizontal matrix of H-components of block x, which is a square matrix obtained by horizontally arranging the H-components of block x. For example, x4,H indicating a horizontal matrix of H-components of block $X_4$ is shown below.

$$X_{4,H} = \begin{matrix} M & M & M & M \\ N & N & N & N \\ O & O & O & O \\ P & P & P & P \end{matrix}$$

$c_1$, $c_2$, $c_3$, and $c_4$ indicating coefficient matrices are determined by a compression mode. A compression mode of a 4×4 block comprises a vertical direction prediction mode, a horizontal direction prediction mode, a DC prediction mode, and a diagonal down left prediction mode. Those modes are known to those skilled in the art, so a more detailed description thereof is omitted.

In order to compute the averages of the prediction blocks, the V-components and H-components of the current block are used. Accordingly, V-prediction components $y_{41}$, $y_{42}$, $y_{43}$ and $y_{44}$, and H-prediction components $y_{14}$, $y_{24}$, $y_{34}$ and $y_{44}$ of the current prediction block $y_{pred}$ are used in order to compute the V-components and H-components of the current block. The V-prediction components and H-prediction components of the current prediction block $y_{pred}$ are computed in advance using the following Equation 2.

$$y_{pred,V} = x_{1,V}c_{1,V} + x_{2,V}c_{2,V} + x_{3,V}c_{3,V} + (c_{4,1}x_{4,H})^T$$

$$y_{pred,H} = (x_{1,V}c_{1,H} + x_{2,H}c_{3,V}c_{3,H})^T + c_{4,H}x_{4,H} \quad \text{[Equation 2]}$$

In Equation 2, $y_{pred,V}$ denotes a vertical matrix of the V-prediction components of the current prediction block $y_{pred}$, and $y_{pred,H}$ denotes a horizontal matrix of the H-prediction components of the current prediction block $y_{pred}$. $c_{1,V}$, $c_{2,V}$, $c_{3,V}$, $c_{4,1}$, $c_{1,H}$, $c_{2,H}$, $c_{3,H}$, and $c_{4,H}$, indicating coefficient matrices are determined by the compression mode.

The process for computing the average $M(Y_{pred,ave})$ of the current prediction block $y_{pred}$ on the pixel domain is explained above. However, in order to obtain the average of the current prediction block without decoding blocks, the average of the current prediction block is computed on a frequency domain. A computation formula used for computing the average, V-prediction components and H-prediction components of the current prediction block on a frequency domain is obtained by the frequency transformation of Equations 1 and 2, and as a result, is represented by the following Equation 3.

$$Y_{pred,ave} = X_{1,V}C_1 + X_{2,V}C_2 + X_{3,V}C_3 + C_4 X_{4,H} \quad (1)$$

$$M(Y_{pred,ave}) = \frac{1}{4} Y_{pred,ave(0,0)} \quad (2)$$

$$Y_{pred,V} = X_{1,V}C_{1,V} + X_{2,V}C_{2,V} + X_{3,V}C_{3,V} + (C_{4,V}X_{4,H})^T \quad (3)$$

$$Y_{pred,H} = (X_{1,V}C_{1,H} + X_{2,V}C_{2,H} + X_{3,V}C_{3,H})^T + C_{4,H}X_{4,H} \quad (4)$$

The compression image comprises a plurality of super macroblocks. The super macroblocks comprise two macroblocks having a size of 16×16. Accordingly, the macroblocks comprise sixteen 4×4 blocks, and the super macroblock comprises thirty-two 4×4 blocks.

If the compression image is generated by a frame encoding technique, the super macroblocks of the compression image may comprise two frame macroblocks. A frame macroblock at the upper edge of the super macroblocks is referred to as an upper frame macroblock, and a frame macroblock at the lower edge of the super macroblocks is referred to as a lower frame macroblock.

Additionally, if the compression image is generated by a field encoding technique, the super macroblocks of the compression image may comprise two field macroblocks. A field macroblock at the upper edge of the super macroblocks is referred to as a top field macroblock, and a field macroblock at the lower edge of the super macroblocks is referred to as a bottom field macroblock.

If the compression image is generated by the AFF encoding technique, the super macroblocks of the compression image may comprise two frame macroblocks or two field macroblocks.

In the situation in which the compression image is generated by the frame encoding technique or field encoding technique, the average of the prediction blocks may be computed by applying the above-described computation process.

Hereinafter, a process for computing the average of the prediction blocks when the compression image is generated by the AFF encoding technique will be described in detail.

Figure 3A:
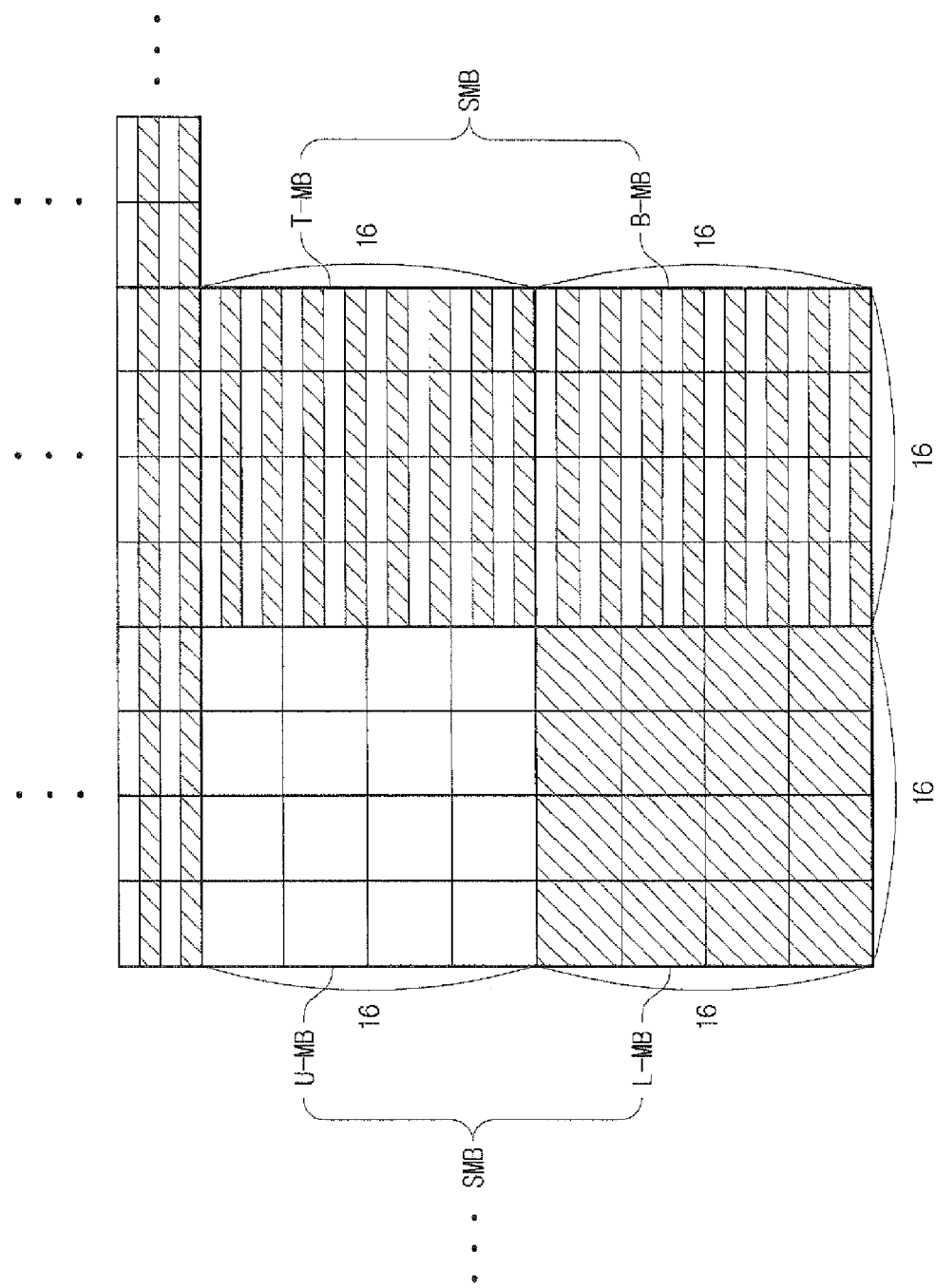

FIG. 3A shows a portion of the compression image generated by the AFF encoding technique. In FIG. 3A, previous super macroblocks, that is, the super macroblocks at the left edge, are the super macroblocks generated by the frame encoding technique, and current super macroblocks, that is, the super macroblocks at the right edge, are the super macroblocks generated by the field encoding technique.

Accordingly, the previous super macroblocks comprise the upper and the lower frame macroblocks U-MB and L-MB, and the current super macroblocks comprise the top and the bottom field macroblocks T-MB and B-MB.

A detailed description will be given below, with reference to FIG. 3B, of a process for computing the average of the prediction blocks, if the previous super macroblocks are the super macroblocks generated by the frame encoding technique, and the current super macroblocks are the super macroblocks generated by the field encoding technique, as shown in FIG. 3A.

FIG. 3B is an exemplary view explaining a process for computing an average of a first prediction block (at the uppermost-leftmost edge of the current super macroblock). Pixels and pixel values are represented by the same character for ease of understanding and convenience of description. For example, the pixel value of pixel "A" is "A".

The average of the first prediction block $y_{pred}$ at the leftmost edge of the current super macroblock is computed using pixel values of some pixels among pixels of neighboring blocks $x_1$, $x_2$ and $x_3$, and previous super macroblock $x_4$.

More specifically, the average of the current prediction block $y_{pred}$ is computed using 1) "V-component" (pixel values a, b, c, and d of pixels at the bottommost) of block $x_1$ at the upper-left edge of the current prediction block $y_{pred}$, 2) "V-component" (pixel values e, f, g, and h of pixels at the bottommost) of block $x_2$ at the upper edge of the current prediction block $y_{pred}$, 3) "V-component" (pixel values i, j, k, and l of pixels at the bottommost) of block $x_3$ at the upper-right edge of the current prediction block $y_{pred}$, and 4) "H-components" of previous super macroblock $x_4$. The computation is performed using the above Equation 1. Equation 1 was described above, so a more detailed description thereof is omitted.

The H-components of the previous super macroblock comprise pixel values m and o of some pixels among the pixels at the rightmost edge of the upper frame macroblock U-MB of the previous super macroblock, and pixel values n and p of some pixels among the pixels at the rightmost edge of the lower frame macroblock L-MB of the previous super macroblock. For example, $x_{4,H}$ indicating a horizontal matrix of H-components of block $x_4$ is shown below.

$$X_{4,H} = \begin{matrix} m & m & m & m \\ n & n & n & n \\ o & o & o & o \\ p & p & p & p \end{matrix}$$

In order to compute the averages of the prediction blocks, the V-components and H-components of the current block are used. Accordingly, V-prediction components and H-prediction components of the current prediction block $y_{pred}$ are used in order to compute the V-components and H-components of the current block. The V-prediction components and H-prediction components of the current prediction block $y_{pred}$ are computed in advance using the above Equation 2. Equation 2 was described above, so a more detailed description thereof is omitted.

The H-components of the previous super macroblock, which are used in order to compute the average of the first prediction block $y_{pred}$ at the leftmost edge of the current super macroblock, comprise pixel values of the first and second pixels at the rightmost edge of the upper frame macroblock U-MB and pixel values of the first and second pixels at the rightmost edge of the lower frame macroblock L-MB.

The H-components of the previous super macroblock, which are used in order to compute an average of a second prediction block (FIG. 3B ②) at the leftmost edge of the current super macroblock, comprise pixel values of the third and fourth pixels at the rightmost edge of the upper frame macroblock U-MB and pixel values of the third and fourth pixels at the rightmost edge of the lower frame macroblock L-MB.

Additionally, the H-components of the previous super macroblock, which are used in order to compute an average of a third prediction block (FIG. 3B ③) at the leftmost edge of the current super macroblock, comprise pixel values of the fifth and sixth pixels at the rightmost edge of the upper frame macroblock U-MB and pixel values of the fifth and sixth pixels at the rightmost edge of the lower frame macroblock L-MB.

The H-components of the previous super macroblock, which are used in order to compute averages of fourth to eighth prediction blocks (FIG. 3B ④~⑧) at the leftmost edge of the current super macroblock, comprise pixel values in the same manner as described above, and thus more detailed descriptions thereof are omitted.

An average of prediction blocks which are not located at the leftmost edge of the current super macroblock is computed using pixel values of some pixels among the pixels of the neighboring blocks. As the computation is performed in the same manner as in the process of FIG. 2, a more detailed description thereof is omitted.

The process for computing the average of the prediction blocks, when the previous super macroblocks are the super macroblocks generated by the frame encoding technique and the current super macroblocks are the super macroblocks generated by the field encoding technique, is explained above in detail.

Hereinafter, a detailed description will be given of a process for computing an average of the prediction blocks, when the previous super macroblocks are the super macroblocks generated by the field encoding technique and the current super macroblocks are the super macroblocks generated by the frame encoding technique.

Figure 4A:
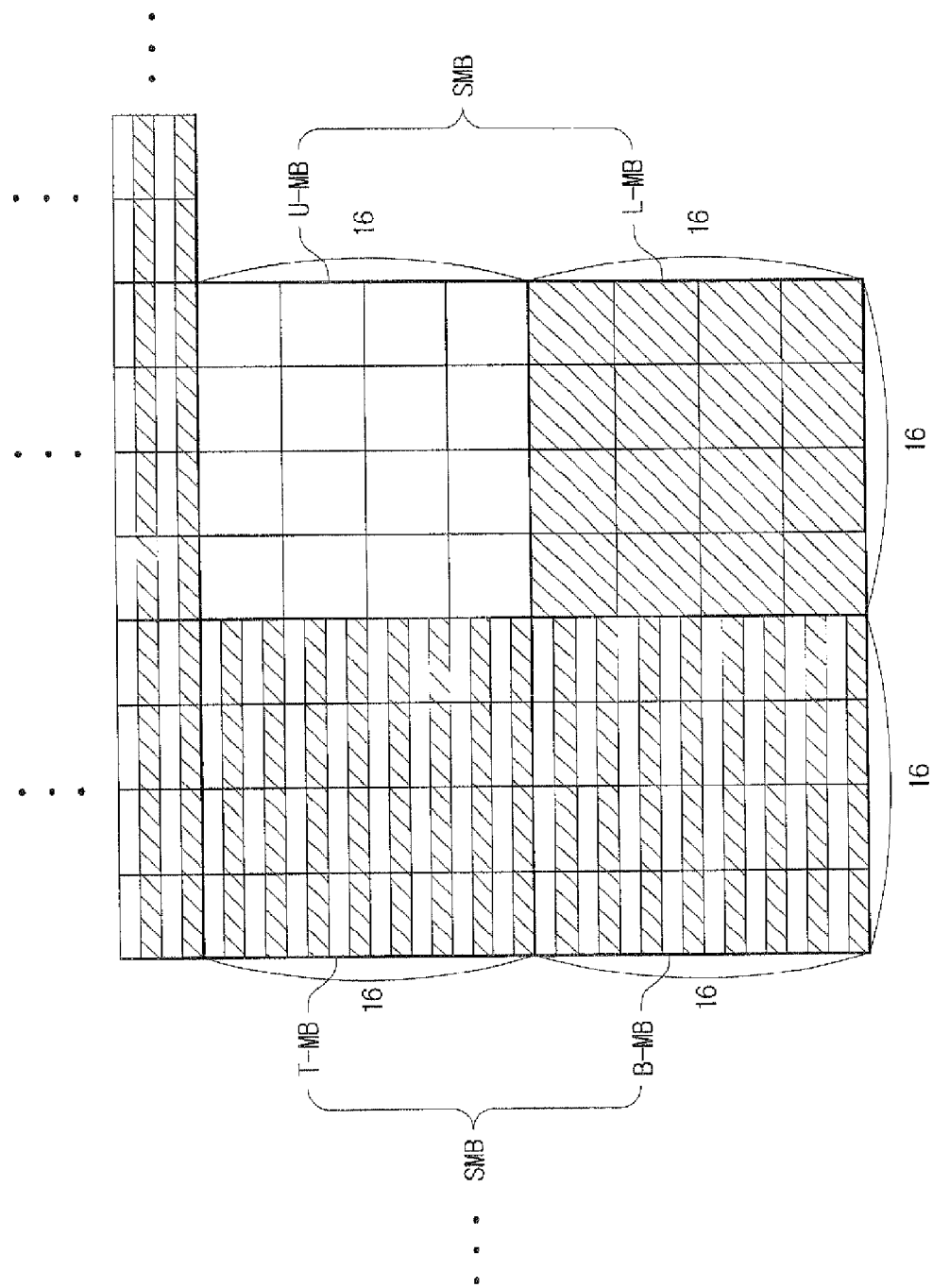
FIGS. 4A and 4B are exemplary views explaining an operation for computing the average of prediction blocks, when previous super macroblocks are super macroblocks generated by the field encoding technique and current super macroblocks are super macroblocks generated by the frame encoding technique.

FIG. 4A shows a portion of the compression image generated by the AFF encoding technique. In FIG. 4A, previous super macroblocks, that is, the super macroblocks at the left edge, are the super macroblocks generated by the field encoding technique, and current super macroblocks, that is, the super macroblocks at the right edge, are the super macroblocks generated by the frame encoding technique.

Accordingly, the previous super macroblocks comprise the top and the bottom field macroblocks T-MB and B-MB, and the current super macroblocks comprise the upper and the lower frame macroblocks U-MB and L-MB.

A detailed description will be given below with reference to FIG. 4B, of a process for computing the average of the prediction blocks, if the previous super macroblocks are the super macroblocks generated by the field encoding technique, and the current super macroblocks are the super macroblocks generated by the frame encoding technique, as shown in FIG. 4A.

Figure 4B:
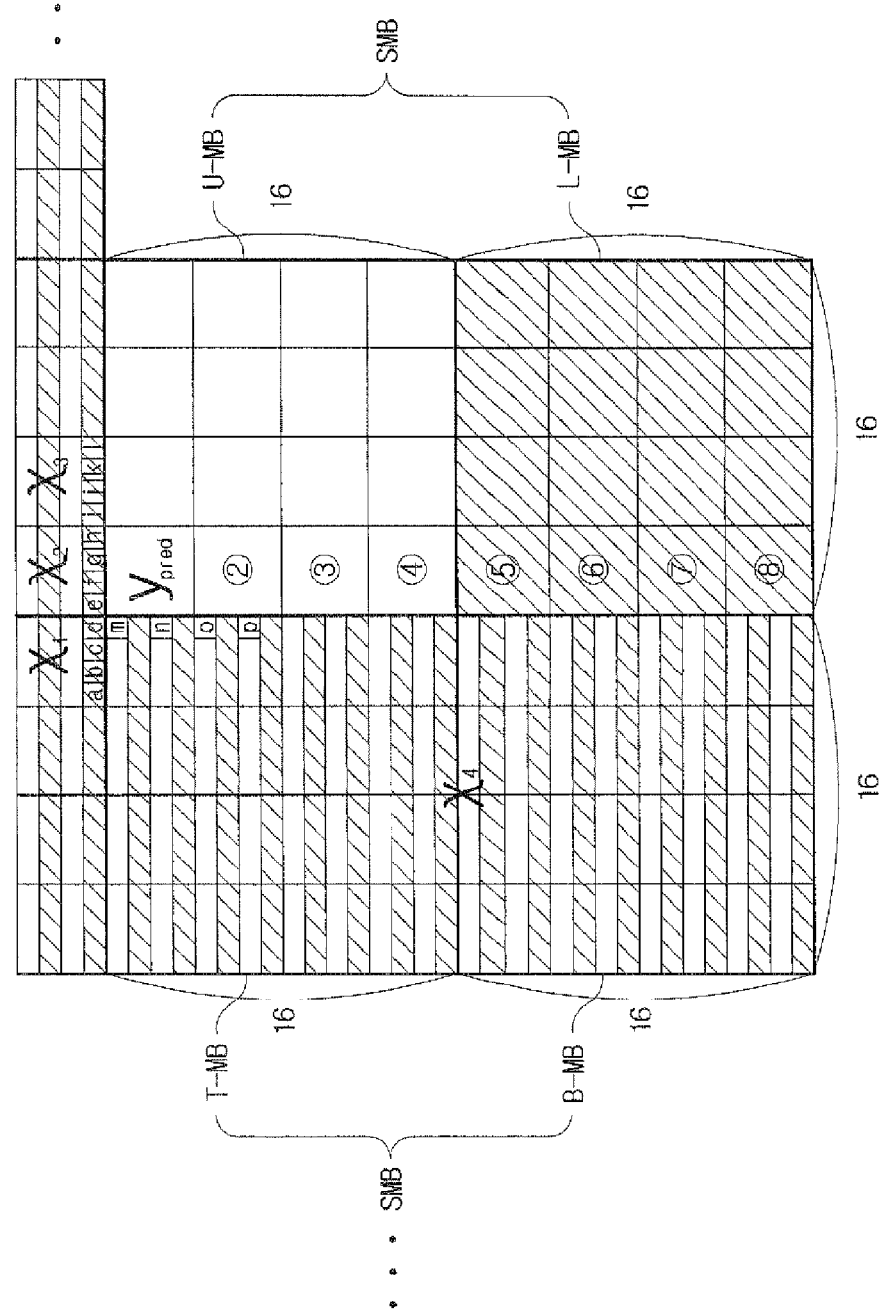

FIG. 4B is an exemplary view explaining a process for computing an average of a first prediction block (at the uppermost-leftmost edge of the current super macroblock). Pixels and pixel values are represented by the same character for ease of understanding and convenience of description. For example, the pixel value of pixel "A" is "A".

The average of the first prediction block $y_{pred}$ at the leftmost edge of the current super macroblock is computed using pixel values of some pixels among pixels of neighboring blocks $x_1$, $x_2$ and $x_3$, and previous super macroblock $x_4$.

More specifically, the average of the current prediction block $y_{pred}$ is computed using 1) "V-component" (pixel values a, b, c, and d of pixels at the bottommost) of block $x_1$ at the upper-left edge of the current prediction block $y_{pred}$, 2) "V-component" (pixel values e, f, g, and h of pixels at the bottommost) of block $x_2$ at the upper edge of the current prediction block $y_{pred}$, 3) "V-component" (pixel values i, j, k, and l of pixels at the bottommost) of block $x_3$ at the upper-right edge of the current prediction block $y_{pred}$, and 4) "H-components" of previous super macroblock $x_4$. The computation is performed using the above Equation 1. Equation 1 was described above, so a more detailed description thereof is omitted.

The H-components of the previous super macroblock comprise pixel values m, n, o and p of some pixels among the pixels at the rightmost edge of the previous super macroblock, and $x_{4,H}$ indicating a horizontal matrix of H-components of block $x_4$ is shown below.

$$X_{4,H} = \begin{matrix} m & m & m & m \\ n & n & n & n \\ o & o & o & o \\ p & p & p & p \end{matrix}$$

In order to compute the averages of the prediction blocks, the V-components and H-components of the current block are used. Accordingly, V-prediction components and H-prediction components of the current prediction block $y_{pred}$ are used in order to compute the V-components and H-components of the current block. The V-prediction components and H-prediction components of the current prediction block $y_{pred}$ are computed in advance using the above Equation 2. Equation 2 was described above, so a more detailed description thereof is omitted.

The H-components of the previous super macroblock, which are used in order to compute the average of the first prediction block $Y_{pred}$ at the leftmost edge of the current super macroblock, comprise pixel values of the first, third, fifth, and seventh pixels at the rightmost edge of the previous super macroblock.

The H-components of the previous super macroblock, which are used in order to compute an average of a second prediction block (FIG. 4B ②) at the leftmost edge of the current super macroblock, comprise pixel values of the ninth, eleventh, thirteenth, and fifteenth pixels at the rightmost edge of the previous super macroblock.

Additionally, the H-components of the previous super macroblock, which are used in order to compute an average of a fifth prediction block (FIG. 4B ⑤) at the leftmost edge of the current super macroblock, comprise pixel values of the second, fourth, sixth, and eighth pixels at the rightmost edge of the previous super macroblock.

Accordingly, the H-components of the previous super macroblock, which are used in order to compute the average of the prediction blocks at the leftmost edge of the upper frame macroblock U-MB of the current super macroblock, may comprise pixel values of some pixels among the odd-numbered pixels at the rightmost edge of the previous super macroblock.

In addition, the H-components of the previous super macroblock, which are used in order to compute the average of the prediction blocks at the leftmost edge of the lower frame macroblock L-MB of the current super macroblock, may comprise pixel values of some pixels among the even-numbered pixels at the rightmost edge of the previous super macroblock.

An average of prediction blocks which are not located at the leftmost edge of the current super macroblock is computed using pixel values of some pixels among the pixels of the neighboring blocks. As the computation is performed in the same manner as in the process of FIG. 2, a more detailed description thereof is omitted.

The process for computing the average of the prediction blocks on the pixel domain when the compression image is generated by the AFF encoding technique is described above. However, in order to compute the average of the current prediction blocks without decoding blocks, the average of the current prediction blocks is computed on the frequency domain. A computation formula used for computing the average, V-prediction components and H-prediction components of the current prediction block on the frequency domain is represented by the above Equation 3. Equation 3 is described above, so a more detailed description thereof is omitted.

Figure 5:
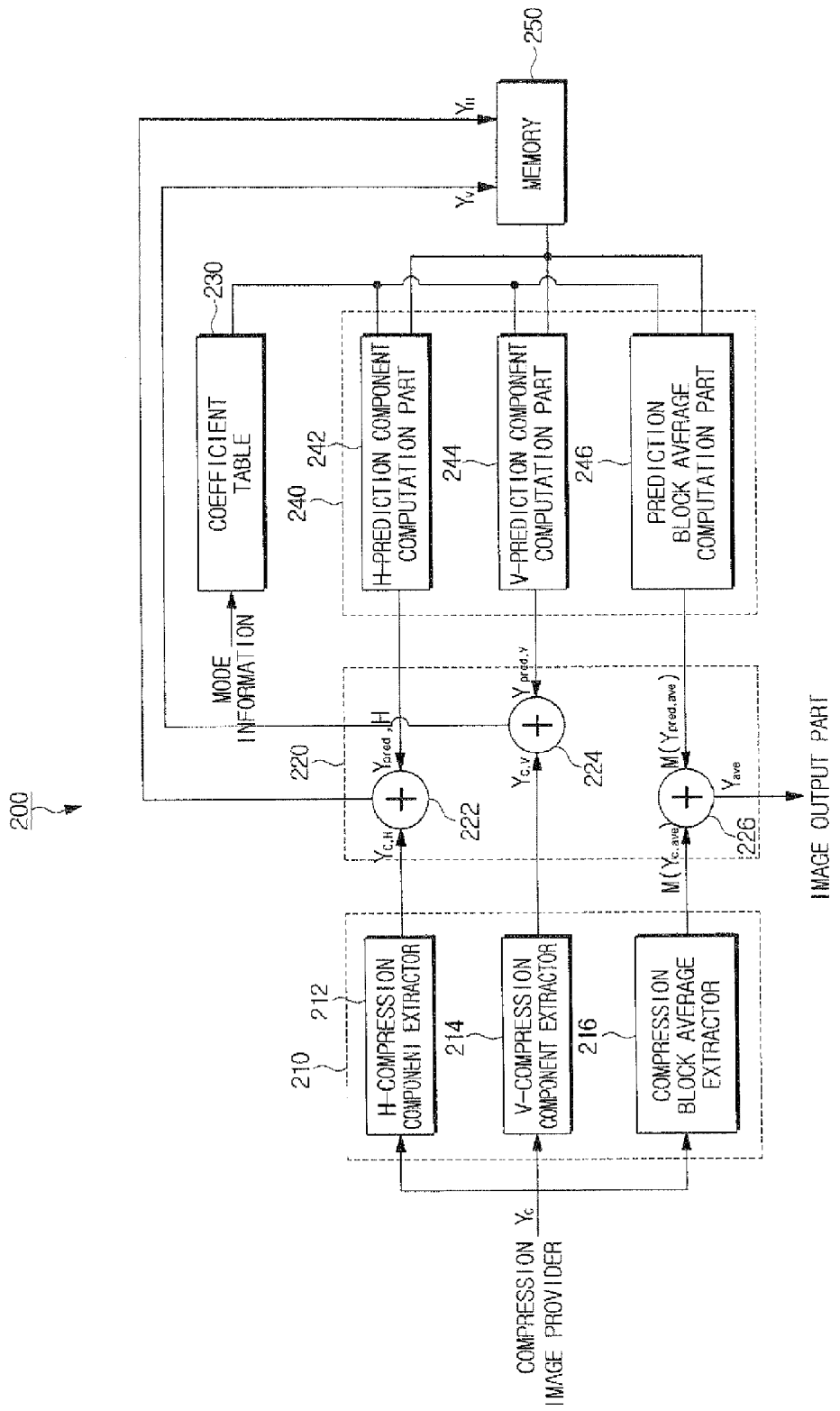
FIG. 5 is a detailed block diagram of a reduced image generator of FIG. 1.

The reduced image generator 200 of FIG. 1 generates a reduced image using the averages of the prediction blocks, computed by the above-described process. FIG. 5 is a detailed block diagram of the reduced image generator 200 of FIG. 1. As shown in FIG. 5, the reduced image generator 200 comprises an extractor 210, an adder 220, a coefficient table 230, a computation part 240, and a memory 250.

The extractor 210 extracts the average, V-compression components, and H-compression components of blocks (hereinafter referred to as "compression blocks") of the compression image provided by the compression image provider 110. The extractor 210 comprises an H-compression component extractor 212, a V-compression component extractor 214, and a compression block average extractor 216.

The H-compression component extractor 212 extracts H-compression components of the compression block (i.e., frequency values at the rightmost edge of the compression block), and outputs a horizontal matrix $Y_{C,H}$ of the extracted H-compression components of the compression block.

The V-compression component extractor 214 extracts V-compression components of the compression block (i.e., frequency values at the bottommost edge of the compression block), and outputs a vertical matrix $Y_{C,V}$ of the extracted V-compression components of the compression block.

The compression block average extractor 216 extracts a DC value which is a frequency value of (0,0) at the leftmost/uppermost of the compression block, and outputs the extracted DC value as the average $M(Y_{C, ave})$ of the compression blocks.

The coefficient table 230 stores and outputs the coefficient matrices determined according to the compression mode to the computation part 240.

The computation part 240 computes the H-prediction components, V-prediction components, and average of the prediction block. The computation part 240 comprises a H-prediction component computation part 242, a V-prediction component computation part 244, and a prediction block average computation part 246.

The H-prediction component computation part 242 computes a horizontal matrix $Y_{pred,H}$ of the H-prediction components of the prediction block using horizontal matrices $Y_H$ of H-components of the previous super macroblock obtained by horizontal matrices $Y_H$ of H-components of the neighboring blocks stored in the memory 250 (hereinafter, simply referred to as horizontal matrices $Y_H$ of H-components of the previous super macroblock), vertical matrices $Y_V$ of V-components of the neighboring blocks stored in the memory 250, and coefficient matrices output from the coefficient table 230. This computation is performed using (4) of Equation 3 described above.

The V-prediction component computation part 244 computes a vertical matrix $Y_{pred,V}$ of the V-prediction components of the prediction block using horizontal matrices $Y_H$ of H-components of the previous super macroblock, vertical matrices $Y_V$ of V-components of the neighboring blocks stored in the memory 250, and coefficient matrices output from the coefficient table 230. This computation is performed using (3) of Equation 3 described above.

The prediction block average computation part 246 computes the average $M(Y_{pred,ave})$ of the prediction block using horizontal matrices $Y_H$ of H-components of the previous super macroblock, vertical matrices $Y_V$ of V-components of the neighboring blocks stored in the memory 250, and coefficient matrices output from the coefficient table 230. This computation is performed using (1) and (2) of Equation 3 described above.

The adder 220 computes the horizontal matrix $Y_H$ of the H-components of the block, vertical matrix $Y_V$ of the V-components of the block, and the average $M(Y_{pred})$ of the block, using the output from the extractor 210 and output from the computation part 240. The adder 220 comprises an H-components adder 222, a V-components adder 224, and an average adder 226.

The H-components adder 222 stores in the memory 250 the horizontal matrix $Y_H$ of the H-components of the block obtained by summing the horizontal matrix $Y_{C,H}$ of the H-compression components of the compression block output from the H-compression component extractor 212 and the horizontal matrix $Y_{pred,H}$ of the H-prediction components of the prediction block computed by the H-prediction component computation part 242. This is because the horizontal matrix $Y_H$ may be used in order to compute the average, H-prediction components, and V-prediction components of the next prediction block.

The V-components adder 224 stores in the memory 250 the vertical matrix $Y_V$ of the V-components of the block obtained by summing the vertical matrix $Y_{C,V}$ of the V-compression components of the compression block output from the V-compression component extractor 214 and the vertical matrix $Y_{pred,V}$ of the V-prediction components of the prediction block computed by the V-prediction component computation part 244. This is because the vertical matrix $Y_V$ may be used in order to compute the average, H-prediction components, and V-prediction components of the next prediction block.

The average adder 226 outputs the average $M(Y_{ave})$ of the block, obtained by summing the average $M(Y_{C,ave})$ of the compression block output from the compression block average extractor 216 and the average $M(Y_{pred,ave})$ of the prediction block computed by the prediction block average computation part 246, to the image output part 130. An image comprising the above average values denotes a reduced image. If a block has a size of 4×4, the reduced image as generated above may occupy 1/16 of the current image area, because 16 pixels are reduced to one pixel.

Figure 6:
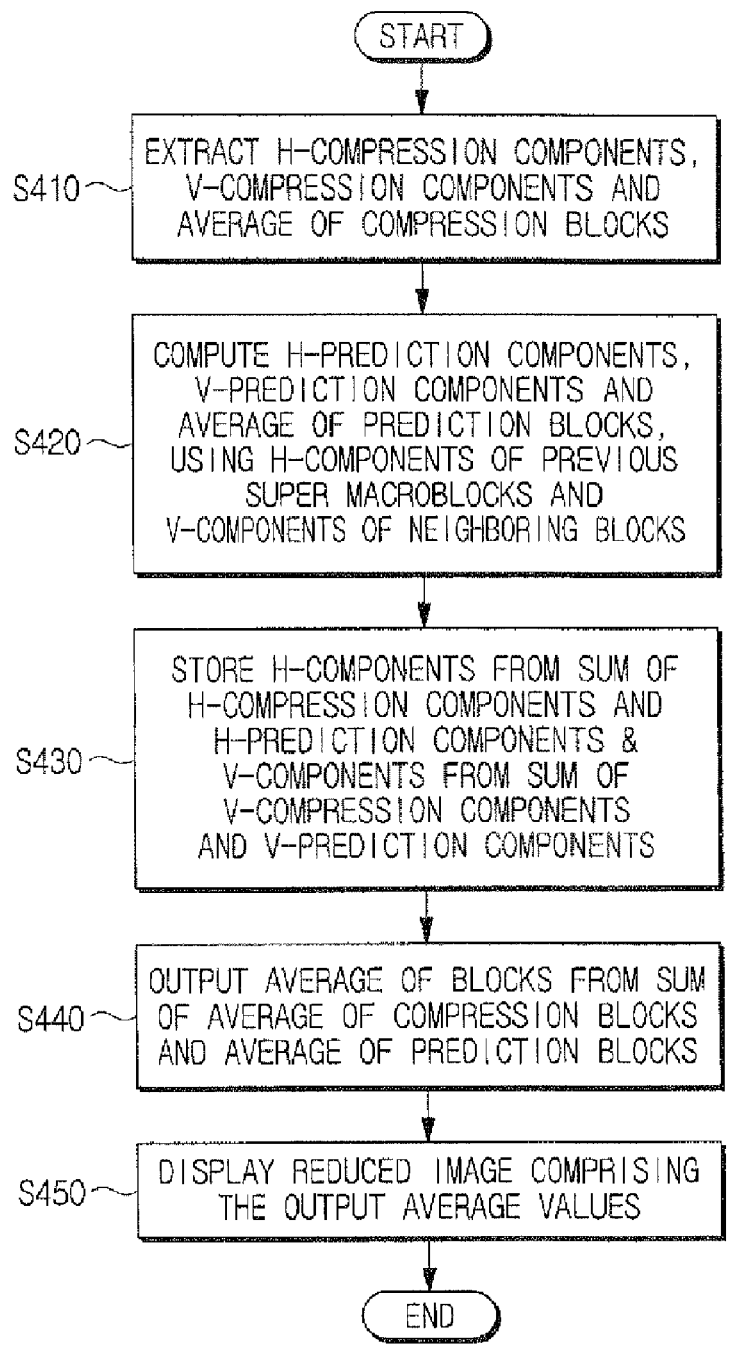
FIG. 6 is a flowchart explaining a method for generating a reduced image according to an exemplary embodiment of the present invention.

Hereinafter, a process for generating a reduced image in an image apparatus according to an exemplary embodiment of the present invention will be described in detail with reference to FIG. 6. FIG. 6 is a flowchart explaining a method for generating a reduced image according to an exemplary embodiment of the present invention.

In FIG. 6, the H-compression component extractor 212, V-compression component extractor 214 and compression block average extractor 216 included in the extractor 210 extract the H-compression components, V-compression components and average of the compression block, respectively, in operation S410.

The horizontal matrix $Y_{C,H}$ of the H-compression components, vertical matrix $Y_{C,V}$ of the V-compression components and average $M(Y_{C, ave})$ of the compression block are output from the extractor 210.

The H-prediction component computation part 242, V-prediction component computation part 244 and prediction block average computation part 246 included in the computation part 240 compute the H-prediction components, V-prediction components, and average of the prediction block, using the horizontal matrices $Y_H$ of the H-components of the previous super macroblock, vertical matrices $Y_V$ of V-components of the neighboring blocks stored in the memory 250, and coefficient matrices output from the coefficient table 230, respectively, in operation S420.

The horizontal matrix $Y_{pred,H}$ of the H-prediction components, vertical matrix $Y_{pred,V}$ of the V-prediction components and average $M(Y_{pred, ave})$ of the prediction block are output from the computation part 240.

The H-component adder 222 and V-component adder 224 included in the adder 220 store in the memory 250 H-components of a block obtained by summing the H-compression components of the compression block and H-prediction components of the prediction block, and V-components of a block obtained by summing the V-compression components of the compression block and V-prediction components of the prediction block in operation S430.

More specifically, the horizontal matrix $Y_H$ of the H-components and vertical matrix $Y_V$ of the V-components of the block are stored in the memory 250.

Additionally, the average adder 226 included in the adder 220 outputs the block average $Y_{ave}$ obtained by summing the average $M(Y_{C,ave})$ of the compression block and average $M(Y_{pred,ave})$ of the prediction block to the image output part 130 in operation S440.

The image output part 130 displays a reduced image comprising the averages output from the average adder 226 on a display in operation S450.

The process for generating a reduced image of an original image without decoding blocks of the original image encoded using the AFF encoding technique by intra prediction is explained above in detail, according to the exemplary embodiment of the present invention.

The exemplary embodiment of the present invention may be applied in a case of generating a reduced image of an original image compressed according to the AFF encoding technique by intra prediction, such as using an H.264 compression technique.

Additionally, in exemplary embodiments of the present invention, the blocks having a size of 4×4 to constitute an image are used, but the present invention is not limited thereto. The present inventive concept may be applied to blocks of an size. For example, the present inventive concept may be applied in the case of blocks having a size of 8×8 or a size of 16×16.

Hereinafter, another exemplary embodiment of the present invention will described in detail with reference to FIGS. 7 and 8.

Figure 7:
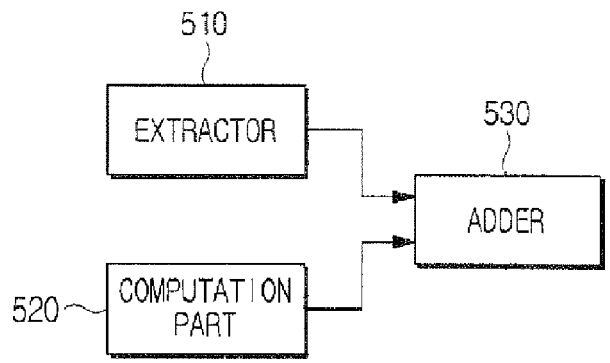
FIG. 7 is a block diagram of an image apparatus according to another exemplary embodiment of the present invention.

Referring to FIG. 7, an image apparatus according to another exemplary embodiment of the present invention comprises an extractor 510, a computation part 520, and an adder 530.

The extractor 510 extracts an average of compression blocks of the current super macroblocks contained in the original image encoded using the AFF encoding technique by intra prediction.

If an encoding technique of the current super macroblocks is different from an encoding technique of the previous super macroblocks at the left edge of the current super macroblocks, the computation part 520 may compute the average of the prediction blocks using a portion of the components of the previous super macroblocks and a portion of the components of the neighboring blocks to the prediction block corresponding to the compression block.

The adder 530 generates a reduced image using the average of the compression blocks and the average of the prediction blocks.

Figure 8:
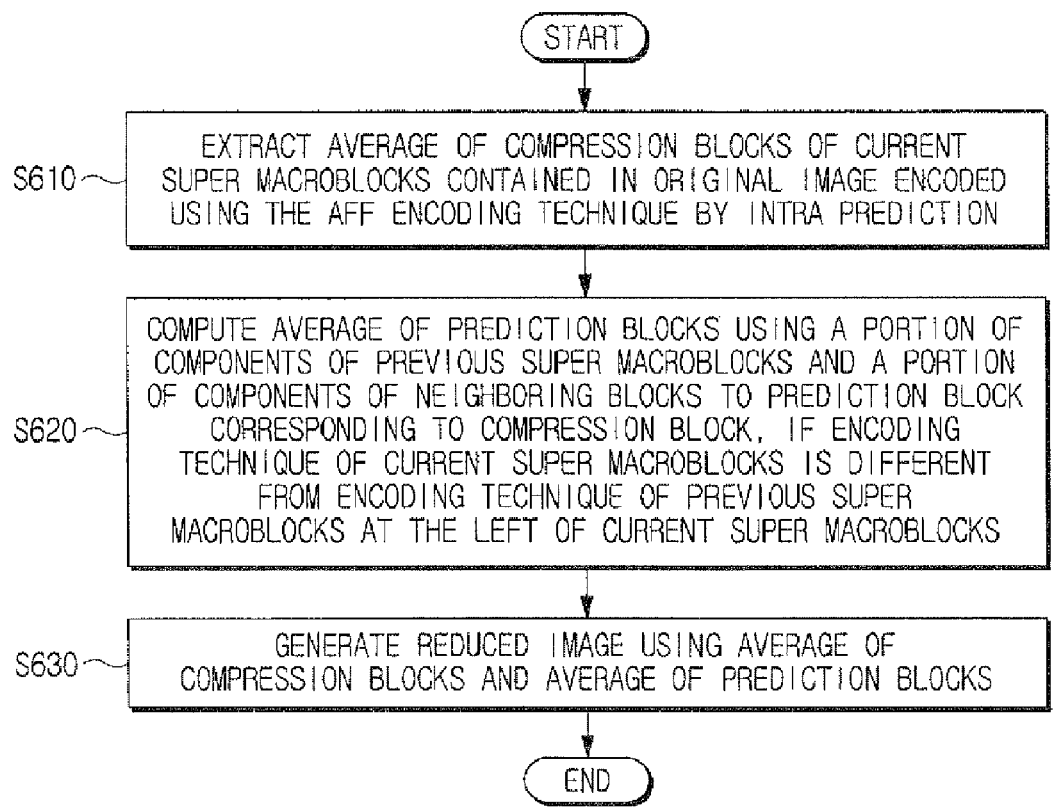
FIG. 8 is a flowchart explaining a method for generating a reduced image according to another exemplary embodiment of the present invention.

According to the method for generating a reduced image of FIG. 8, the extractor 510 extracts an average of compression blocks of the current super macroblocks contained in the original image encoded using the AFF encoding technique by intra prediction in operation S610.

If an encoding technique of the current super macroblocks is different from an encoding technique of the previous super macroblocks at the left edge of the current super macroblocks, the computation part 520 may compute the average of the prediction blocks using a portion of the components of the previous super macroblocks and a portion of the components of the neighboring blocks to the prediction block corresponding to the compression block in operation S620.

The adder 530 then generates a reduced image using the average of the compression blocks and the average of the prediction blocks in operation S630.

Accordingly, according to exemplary embodiments of the present invention, it is possible to implement the method for generating a reduced image of an original image and the image apparatus thereof, without decoding blocks of the original image encoded using the AFF encoding technique by intra prediction.

According to exemplary embodiments of the present invention as described above, a reduced image of an original image may be generated without decoding blocks of the original image encoded using the AFF encoding technique by intra prediction. Therefore, the computations and time required for generating the reduced image can be reduced.

The foregoing exemplary embodiments and advantages are merely exemplary and are not to be construed as limiting the present invention. The present inventive concept can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for generating a reduced image, the method comprising:

extracting an average of compression blocks of current super macroblocks contained in a compression image, the compression image being encoded by intra prediction;

computing, using a processor, an average of prediction blocks, using a portion of components of previous super macroblocks and a portion of components of blocks neighboring the prediction blocks corresponding to the compression blocks, based on whether an encoding technique of the current super macroblocks is different from an encoding technique of the previous super macroblocks at a left edge of the current super macroblocks; and generating a reduced image using the average of the compression blocks and the average of the prediction blocks.

2. The method as claimed in claim 1, wherein the computing comprises computing the average of the prediction blocks using a portion of components at a rightmost edge of upper frame macroblocks of the previous super macroblocks and a portion of components at a rightmost edge of lower frame macroblocks of the previous super macroblocks, if the current super macroblocks are super macroblocks generated by a field encoding technique and the previous super macroblocks are super macroblocks generated by a frame encoding technique.

3. The method as claimed in claim 1, wherein the computing comprises computing the average of the prediction blocks using a portion of odd-numbered components at a rightmost edge of the previous super macroblocks or a portion of even-numbered components at the rightmost edge of the previous super macroblocks, if the current super macroblocks are super macroblocks generated by a frame encoding technique and the previous super macroblocks are super macroblocks generated by a field encoding technique.

4. The method as claimed in claim 1, wherein the computing comprises computing the average of the prediction blocks using a portion of components of the neighboring blocks on upper-left, upper and upper-right edges of the prediction block and a portion of components of the previous super macroblocks, and the generating comprises adding the average of the compression blocks and the average of the prediction blocks to generate a reduced image.

5. The method as claimed in claim 1, wherein the computing comprises computing the average of the prediction blocks using frequency values at a bottommost edge of the neighboring block to an upper-left edge of the prediction block, frequency values at a bottommost edge of the neighboring block to an upper edge of the prediction block, frequency values at a bottommost edge of the neighboring block to an upper-right edge of the prediction block, frequency values at a rightmost edge of the previous super macroblocks, and frequency values of a portion of components at the rightmost edge of the previous super macroblocks.

6. The method as claimed in claim 1, wherein the compression image comprises an original image encoded using an Adaptive Frame/Field (AFF) encoding technique by intra prediction.

7. An image apparatus comprising:
- an extractor which extracts an average of compression blocks of current super macroblocks contained in a compression image, the compression image being encoded by intra prediction;
- a computation part comprising a processor which computes an average of prediction blocks, using a portion of components of previous super macroblocks and a portion of components of blocks neighboring the prediction blocks corresponding to the compression blocks, based on whether an encoding technique of the current super macroblocks is different from an encoding technique of the previous super macroblocks at a left edge of the current super macroblocks; and
- an adder which generates a reduced image using the average of the compression blocks and the average of the prediction blocks.

8. The apparatus as claimed in claim 7, wherein the computation part computes the average of the prediction blocks using a portion of components at a rightmost edge of upper frame macroblocks of the previous super macroblocks and a portion of components at a rightmost edge of lower frame macroblocks of the previous super macroblocks, if the current super macroblocks are super macroblocks generated by a field encoding technique and the previous super macroblocks are super macroblocks generated by a frame encoding technique.

9. The apparatus as claimed in claim 7, wherein the computation part computes the average of the prediction blocks using a portion of odd-numbered components at a rightmost edge of the previous super macroblocks or a portion of even-numbered components at the rightmost edge of the previous super macroblocks, if the current super macroblocks are super macroblocks generated by a frame encoding technique and the previous super macroblocks are super macroblocks generated by a field encoding technique.

10. The apparatus as claimed in claim 7, wherein the computation part computes the average of the prediction blocks using a portion of components of the neighboring blocks on upper-left, upper and upper-right edges of the prediction block and a portion of components of the previous super macroblocks, and
- the adder adds the average of the compression blocks and the average of the prediction blocks to generate a reduced image.

11. The apparatus as claimed in claim 7, wherein the computation part computes the average of the prediction blocks using frequency values at a bottommost edge of the neighboring block to an upper-left edge of the prediction block, frequency values at a bottommost edge of the neighboring block to an upper edge of the prediction block, frequency values at a bottommost edge of the neighboring block to an upper-right edge of the prediction block, frequency values at a rightmost edge of the previous super macroblocks, and frequency values of a portion of components at the rightmost edge of the previous super macroblocks.

12. The apparatus as claimed in claim 7, wherein the compression image comprises an original image encoded using an Adaptive Frame/Field (AFF) encoding technique by intra prediction.

* * * * *